United States Patent
Furuta (10) Patent No.: US 8,860,963 B2
(45) Date of Patent: Oct. 14, 2014

(54) COMMUNICATION SYSTEMS, COMMUNICATION APPARATUS, AND IMAGE PROCESSING APPARATUS THAT PROVIDE ADDITIONAL INFORMATION

(75) Inventor: Taku Furuta, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 233 days.

(21) Appl. No.: 13/353,573

(22) Filed: Jan. 19, 2012

(65) Prior Publication Data

US 2012/0200876 A1  Aug. 9, 2012

(30) Foreign Application Priority Data

Feb. 7, 2011  (JP) .................................. 2011-023645

(51) Int. Cl.
  *G06F 3/12* (2006.01)
  *H04N 1/32* (2006.01)
  *H04N 1/00* (2006.01)

(52) U.S. Cl.
  CPC .... *H04N 1/32101* (2013.01); *H04N 2201/3274* (2013.01); *H04N 2201/0094* (2013.01); *H04N 1/32406* (2013.01); *H04N 2201/0086* (2013.01); *H04N 2201/3205* (2013.01); *H04N 1/00347* (2013.01); *H04N 2201/0055* (2013.01); *H04N 2201/3278* (2013.01)
  USPC ......................................... 358/1.13; 358/1.15

(58) Field of Classification Search
  CPC ....... G06F 3/12; G06F 3/1293; G06F 3/1294; G06F 3/1296; G06F 3/1295
  See application file for complete search history.

(56) References Cited

U.S. PATENT DOCUMENTS

| | | | |
|---|---|---|---|
| 2002/0191228 A1* | 12/2002 | Ishibashi | 358/442 |
| 2008/0151316 A1* | 6/2008 | Yoshida | 358/402 |
| 2009/0322948 A1* | 12/2009 | Funabiki et al. | 348/571 |
| 2012/0176646 A1 | 7/2012 | Furuta | |

FOREIGN PATENT DOCUMENTS

| | | |
|---|---|---|
| JP | S63-043464 A | 2/1988 |
| JP | S63-258155 A | 10/1988 |
| JP | H04-107061 A | 4/1992 |
| JP | H06-030163 A | 2/1994 |
| JP | H09-261377 A | 10/1997 |
| JP | H11-252304 A | 9/1999 |
| JP | 2001-045190 A | 2/2001 |
| JP | 2001-230924 A | 8/2001 |

OTHER PUBLICATIONS

Japan Patent Office, Decision to Grant a Patent for Japanese Patent Application No. 2011-023645 (counterpart Japanese patent application), mailed Jan. 8, 2013.

* cited by examiner

*Primary Examiner* — Fred Guillermety
*Assistant Examiner* — Henok A Shiferaw
(74) *Attorney, Agent, or Firm* — Baker Botts L.L.P.

(57) ABSTRACT

Communication systems, communication apparatus, and image processing apparatus, which connect with communication apparatus are disclosed herein. The communication apparatus includes a first memory, which stores first additional information; an additional-information notifying portion, which notifies the image processing apparatus of the first additional information; and a second transmitter, which transmits image data transmitted from a first transmitter to the destination apparatus. The image processing apparatus includes a second memory, which stores second additional information; an information generator, which generates third additional information; and the first transmitter, which adds the third additional information generated by the information generator to the image data and transmits the image data comprising the third additional information to the communication apparatus. The third additional information includes the first additional information notified by the additional-information notifying portion and the second additional information stored in the second memory.

18 Claims, 8 Drawing Sheets

MFP SOURCE NAME TABLE : 34b

| STANDARD SETTING FLAG | MANAGEMENT NUMBER | MFP SOURCE NAME |
|---|---|---|
| O | 1 | DEVELOPMENT DEPARTMENT |
| | 2 | PLANNING DEPARTMENT |
| | 3 | JHON |
| | 4 | MARY |

Fig.3B

TELEPHONE BOOK MEMORY : 34a

| FAX NUMBER | MANAGEMENT NUMBER |
|---|---|
| 052- X X X-○○○○ | 1 |
| 052-△△△-○○○○ | 1 |
| 053- X X X-○○○○ | 3 |
| 053-△△△-○○○○ | 4 |

| | BOX SOURCE NAME TABLE : 14b | 58 | 70 |
|---|---|---|---|
| 68 — STANDARD SETTING FLAG | BOX SOURCE NAME | FAX NUMBER |
| ○ | A COMPANY | 052-X X X-○○○○ |
| | SMITH | 053-X X X-○○○○ |

COMMUNICATION SYSTEMS, COMMUNICATION APPARATUS, AND IMAGE PROCESSING APPARATUS THAT PROVIDE ADDITIONAL INFORMATION

CROSS-REFERENCE TO RELATED APPLICATION

This application claims priority from Japanese Patent Application No. 2011-023645, filed on Feb. 7, 2011, which is incorporated herein by reference.

BACKGROUND OF THE DISCLOSURE

1. Field of the Invention

The invention relates to communication systems, communication apparatus, and image processing apparatus.

2. Description of Related Art

A technology for adding header information including a sender name to an upper part of each page of a transmission document is known. In a known client-server system, a data processing apparatus of a client performs facsimile communication via a facsimile server. Further, in the known client-server system, source information registered in the facsimile server is added to facsimile data, and the facsimile data to which the source information is added is transmitted.

SUMMARY OF THE INVENTION

In the above-described, related-art technologies, users face great work burdens, such as registering and updating the source information.

Embodiments of the invention comprise communication systems, communication apparatus, and image processing apparatus configured to add appropriate, additional information to image data and to transmit the image data comprising the appropriate additional information to destination apparatus while reducing the work burden on users.

A communication system disclosed herein may comprise a communication apparatus and an image processing apparatus. The communication apparatus may be configured to communicate with a destination apparatus. The image processing apparatus may be configured to connect with the communication apparatus. The communication apparatus may comprise a first memory, an additional-information notifying portion, and a second transmitter. The first memory may be configured to store first additional information. The additional-information notifying portion may be configured to notify the image processing apparatus of the first additional information stored in the first memory. The image processing apparatus may comprise a second memory, an information generator, and a first transmitter. The second memory may be configured to store second additional information. The information generator may be configured to generate third additional information. The first transmitter may be configured to add the third additional information generated by the information generator to the image data and to transmit the image data comprising the third additional information to the communication apparatus. The second transmitter may be configured to transmit image data transmitted from the first transmitter to the destination apparatus. The third additional information may comprise the first additional information notified by the additional-information notifying portion and the second additional information stored in the second memory.

A communication apparatus disclosed herein may comprise a first memory, an additional-information notifying portion, a receiver, and a transmitter. The first memory may be configured to store first additional information. The additional-information notifying portion may be configured to notify an image processing apparatus of the first additional information stored in the first memory. The receiver may be configured to receive image data to which third additional information is added from the image processing apparatus. The transmitter may be configured to transmit the image data received by the receiver to the destination apparatus. The third additional information may comprise the first additional information notified from the additional-information notifying portion and second additional information stored in a second memory provided in the image processing apparatus when certain setting information exists for the communication apparatus.

An image processing apparatus disclosed herein may comprise a receiver, a memory, an information generator, and a transmitter. The receiver may be configured to receive first additional information from a communication apparatus. The memory may be configured to store second additional information. The information generator may be configured to generate third additional information. The transmitter may be configured to add the third additional information generated by the information generator to image data and to transmit the image data comprising the third additional information to the communication apparatus. The third additional information may comprise the first additional information received by the receiver and the second additional information stored in the memory.

Other objects, features, and advantages will be apparent to persons of ordinary skill in the art from the following detailed description of embodiments of the invention and the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

DETAILED DESCRIPTION OF EMBODIMENTS OF THE INVENTION

For a more complete understanding of the present invention, needs satisfied thereby, and the objects, features, and advantages thereof, reference now is made to the following description taken in connection with the accompanying drawings.

Figure 1:
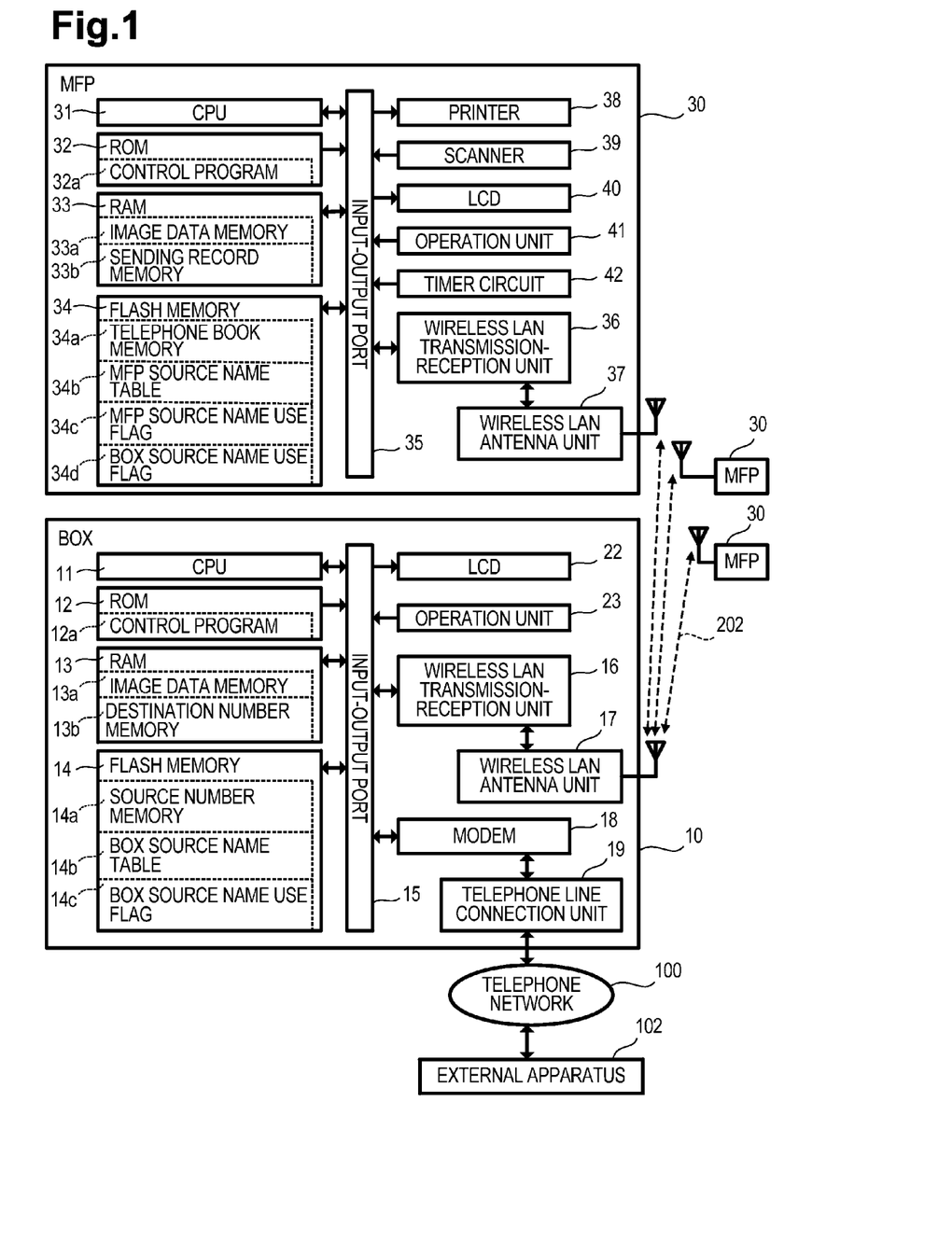
FIG. 1 is a block diagram depicting an electrical configuration of a communication system according to an embodiment of the invention.

Embodiments of the invention are described with reference to the attached drawings. FIG. 1 is a block diagram depicting an electrical configuration of a communication system 1. Communication system 1 may comprise a communication apparatus, e.g., a BOX 10, and an image processing apparatus, e.g., an MFP 30. Communication system 1 may be configured to add an appropriate source name to image data and transmit the image data comprising the source name to a destination apparatus while reducing the work burden on users.

BOX 10 may communicate with a destination apparatus, e.g., an external apparatus 102, over a telephone network 100. BOX 10 may comprise a central processing unit ("CPU") 11, a read only memory ("ROM") 12, a random access memory ("RAM") 13, a flash memory 14, a wireless local area network ("LAN") transmission-reception unit 16, a wireless LAN antenna unit 17, a modem 18, a telephone line connection unit 19, a liquid crystal display ("LCD") 22, and an operation unit 23. These components may connect to each other and may be configured to communicate via an input-output port 15.

CPU 11 may control the components connected to input-output port 15 in accordance with fixed values and programs stored in a memory (e.g., ROM 12) or various signals transmitted and received by wireless communication 202. ROM 12 may be a non-rewritable memory and may store a control program 12a for executing, for example, a process described below with reference to FIG. 5. RAM 13 may be a rewritable volatile memory and may comprise an image data memory 13a storing image data supplied from MFP 30 and a destination number memory 13b storing identification information, e.g., a facsimile ("FAX") number, which identifies a destination apparatus.

Flash memory 14 may be a rewritable non-volatile memory and may comprise a source number memory 14a, a BOX source name table 14b, and a BOX source name use flag 14c. Source number memory 14a may store FAX numbers (e.g., source numbers) allocated to communication system 1 therein. BOX source name table 14b may store BOX source names registered by the user therein. The BOX source name is described below with reference to FIG. 2A.

BOX source name use flag 14c may indicate whether a sending record to be added to the image data comprises the BOX source name therein. BOX 10 may transmit the image data comprising the sending record comprising the BOX source name to the destination apparatus when BOX source name use flag 14c is set to ON and may transmit the image data comprising the sending record that does not comprise the BOX source name to the destination apparatus when BOX source name use flag 14c is set to OFF. The user may operate operation unit 23 in BOX 10 to switch BOX source name use flag 14c between an OFF setting and an ON setting.

Wireless LAN transmission-reception unit 16 may be a circuit that performs wireless communication 202 over a wireless LAN conforming to the Institute of Electrical and Electronic Engineers ("IEEE") 802.11b/g standard. BOX 10 may be connected to MFP 30 and may be configured to communicate with wireless LAN transmission-reception unit 16 via wireless LAN antenna unit 17. Modem 18 may modulate image data to be transmitted via facsimile into a signal capable of being transmitted to telephone network 100 and may transmit the modulated image data through telephone line connection unit 19 or may demodulate a signal received from telephone network 100 through telephone line connection unit 19 into image data. Telephone line connection unit 19 may be used for the connection between telephone network 100 and BOX 10. Telephone line connection unit 19 may connect or disconnect the line in response to an instruction from modem 18 to control the connection state with external apparatus 102. LCD 22 may display, for example, messages for guiding a method of operating BOX 10. Operation unit 23 may comprise keys used to input setting values and instructions into BOX 10.

BOX 10 may transmit and receive the image data with group 3 FAX ("G3FAX") encoding via telephone network 100 in the present embodiment. Alternatively or additionally, BOX 10 may transmit and receive the image data according to other encoding standards, such as group 4 FAX ("G4FAX"), internet protocol FAX ("IPFAX"), or InternetFAX.

MFP 30 may have functions comprising, for example, a printer function, a scanner function, and a copy function. MFP 30 may comprise a CPU 31, a ROM 32, a RAM 33, a flash memory 34, a wireless LAN transmission-reception unit 36, a wireless LAN antenna unit 37, a printer 38, a scanner 39, an LCD 40, an operation unit 41, and a timer circuit 42. These components may connect to each other and may communicate via an input-output port 35.

CPU 31 may control the components connected to input-output port 35 in accordance with fixed values and programs stored in a memory (e.g., ROM 32) or various signals transmitted and received by wireless communication 202. ROM 32 may be a non-rewritable memory and may store a control program 32a for executing, for example, a process described below with reference to FIG. 4. RAM 33 may be a rewritable volatile memory and may comprise an image data memory 33a and a sending record memory 33b. Image data memory 33a may store image data generated by scanner 39 and image data read from a memory card (not depicted) therein. MFP 30 may add a sending record to the image data stored in image data memory 33a and may transmit the image data comprising the sending record to BOX 10. This is described in detail below with reference to FIG. 2B. Sending record memory 33b may store information for creating the sending record to be added to the image data therein.

Flash memory 34 may be a rewritable non-volatile memory and may comprise a telephone book memory 34a, an MFP source name table 34b, an MFP source name use flag 34c, and a BOX source name use flag 34d. Telephone book memory 34a may store a plurality of FAX numbers registered in advance by users. MFP source name table 34b may store MFP source names input by users operating operation unit 41. The MFP source name is described below with reference to FIG. 2A.

MFP source name use flag 34c may indicate whether the sending record comprises the MFP source name. MFP 30 may add the sending record comprising the MFP source name to the image data when MFP source name use flag 34c is set to ON and may add the sending record that does not comprise the MFP source name to the image data when MFP source name use flag 34c is set to OFF. This is described in detail below with reference to FIG. 4.

BOX source name use flag 34d may indicate whether the sending record comprises the BOX source name therein. MFP 30 may add the sending record comprising the BOX source name to the image data when BOX source name use flag 34d is set to ON and may add the sending record that does not comprise the BOX source name to the image data when BOX source name use flag 34d is set to OFF. The user may operate operation unit 41 in MFP 30 to switch MFP source name use flag 34c between an OFF setting and an ON setting.

Wireless LAN transmission-reception unit 36 may comprise a circuit configured similarly to wireless LAN transmission-reception unit 16 in BOX 10 and may establish wireless communication 202 with BOX 10. Printer 38 may form an image on a recording medium (e.g., a sheet of paper). Scanner 39 may scan a document to generate image data. LCD 40 may display, for example, operational processes of MFP 30, a variety of information, and messages. Operation unit 41 may comprise keys used to input setting values and instructions into MFP 30. Timer circuit 42 may measure the current time (comprising the date) and may continue measuring the current time even when MFP 30 is turned off.

As depicted in FIG. 1, a plurality of MFPs 30 capable of communication with one BOX 10 may exist. In this case, communication system 1 may be configured, so that each MFP 30 is configured to perform the facsimile transmission of the image data to external apparatus 102 via BOX 10. Nevertheless, because MFPs 30 may comprise similar configurations, the internal configuration of one MFP 30 of the plurality of MFPs 30 is depicted in FIG. 1, and the internal configurations of other MFPs 30 of the plurality of MFPs 30 is omitted from FIG. 1.

Figure 2A:
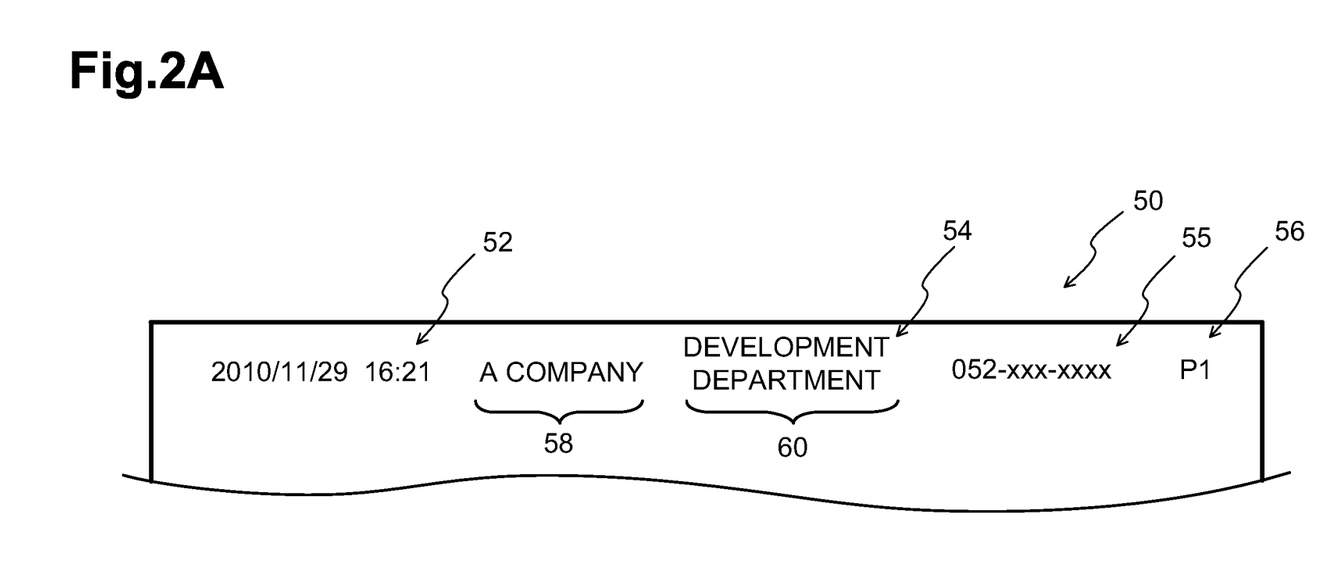
FIG. 2A depicts an example of a sending record.

FIG. 2A depicts an example of a sending record 50. As depicted in FIG. 2A, sending record 50 may comprise transmission date and time information 52, a source name 54, a source number 55, and page information 56 and may be added to the header of image data. When the destination apparatus that has received the image data prints out the received image data, the header of the image data comprising sending record 50 may provide sending information to a recipient.

Transmission date and time information 52 may indicate a date and time when MFP 30 performs facsimile transmission. Source name 54 may be information indicating the source of image data and may comprise a BOX source name 58 and an MFP source name 60. A process of creating source name 54 is described below with reference to FIG. 2B. Source number 55 may comprise information indicating a FAX number allocated to communication system 1 (e.g., the source number stored in source number memory 14a). Page information 56 may indicate the page which corresponds to the image data to be subjected to the facsimile transmission.

Figure 2B:
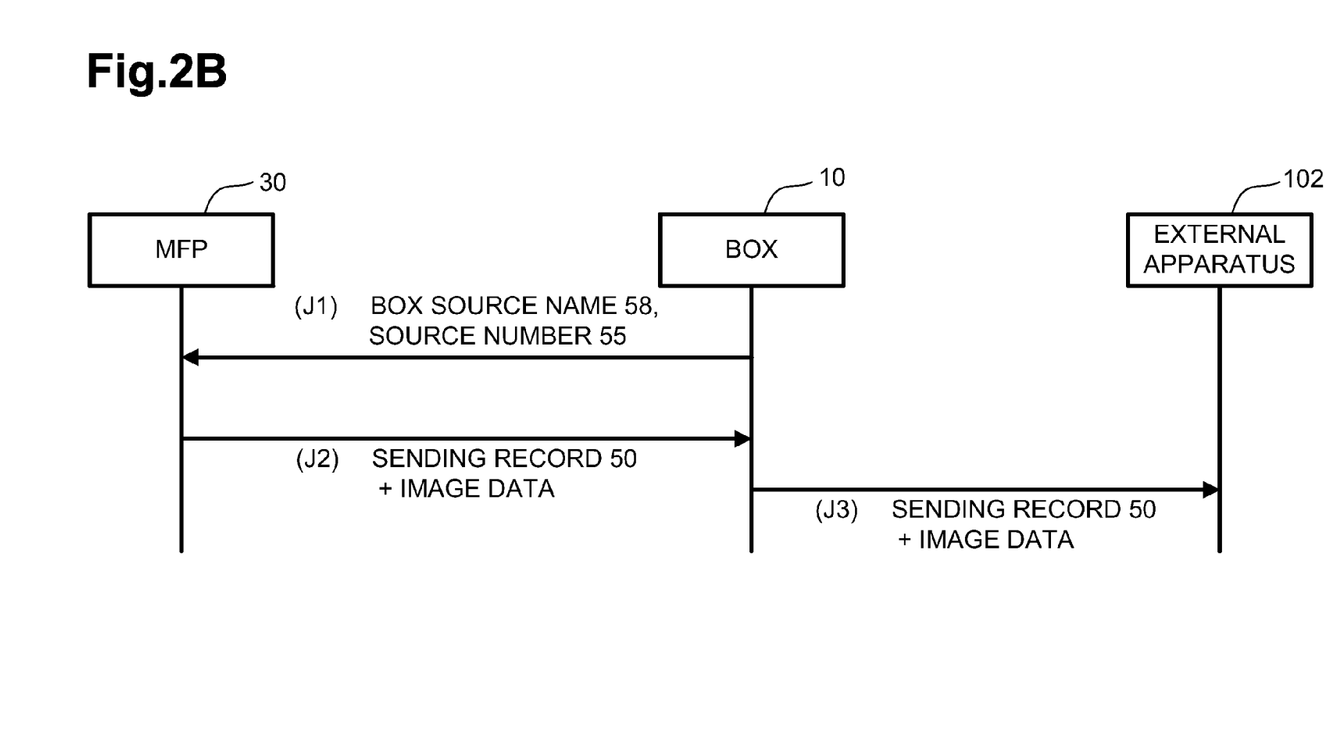
FIG. 2B is a sequence chart depicting a process of creating the sending record.

FIG. 2B is a sequence chart depicting a process of creating sending record 50. Referring to FIG. 2B, in transmission J1, BOX 10 may notify MFP 30 of BOX source name 58 and source number 55 stored in BOX 10. In response to receiving BOX source name 58 and source number 55 stored in BOX 10, MFP 30 may generate source name 54 based on MFP source name 60, which may be stored in MFP 30 in advance, and based on BOX source name 58 notified from BOX 10. In transmission J2, MFP 30 may generate sending record 50 comprising transmission date and time information 52, source name 54, source number 55, and page information 56; may add sending record 50 to the header of image data; and may transmit the image data comprising sending record 50 to BOX 10. In transmission J3, BOX 10 may transmit the image data received from MFP 30 to external apparatus 102 (e.g., the destination apparatus).

With communication system 1, it may be possible to add an appropriate source name 54 to the image data and to transmit the image data comprising source name 54 to the destination apparatus while reducing the work burden on the user. For example, when a plurality of MFPs 30 are connected to one BOX 10, a common part (e.g., a company name) of source name 54 may be registered in advance in BOX 10 as BOX source name 58, and a part (e.g., a department name) corresponding to each MFP 30 may be set in MFP 30 as MFP source name 60. By this method, it may be possible to indicate which of the plurality of MFPs 30 sent the image data by adding source name 54 (e.g., the company name and the department name together) based on BOX source name 58 and MFP source name 60.

For example, when MFP 30 is added to communication system 1, it may be sufficient for the user to set only MFP source name 60 in MFP 30 that is added. In other words, a user may not be required to register newly the common part (e.g., the company name) in source name 54 in MFP 30 that is added. Accordingly, it may be possible to reduce the work burden on the user in the when adding MFP 30 to communication system 1.

For example, when the common part (e.g., the company name) in source name 54 changes, it may be sufficient for the user to change only BOX source name 58 in BOX 10, and it may not be necessary for the user to change the settings for respective MFPs 30. Accordingly, it may be possible to reduce the work burden of managing communication system 1 on the user.

For example, when the user intends to change only MFP source name 60 frequently, such as when multiple departments share one MFP 30 in a Company A, it may be sufficient for the user to change only the setting in MFP source name 60, and it may not be necessary for the user to be aware of the change of BOX source name 58, which is the common part. Accordingly, it may be possible to generate source name 54, which the user desires, and to transmit source name 54 to the destination apparatus while reducing the work burden on the user.

BOX source name 58 may be arranged toward the beginning of sending record 50, as compared with MFP source name 60. Accordingly, information (e.g., the company name) indicating a higher hierarchy in source name 54 may be set as BOX source name 58, and information (e.g., the department name) indicating a lower hierarchy in source name 54 may be set as MFP source name 60 to generate source name 54 (for example, Company A, Development Department), in which the information indicating the lower hierarchy may be arranged next to the information indicating the higher hierarchy.

For example, when one BOX 10 is installed in a home and each member of the family owns MFP 30, information (e.g., a family name) indicating a higher hierarchy in source name 54 may be set as BOX source name 58 and information (e.g., a personal name) indicating a lower hierarchy in source name 54 may be set as MFP source name 60 to generate source name 54, in which the information about the personal name may be arranged next to the information about the family name.

In source name 54, BOX source name 58 and MFP source name 60 may be arranged successively. In other words, no other information may exist between BOX source name 58 and MFP source name 60. This may allow the recipient to read BOX source name 58 and MFP source name 60 as integrated information.

Figure 3A:
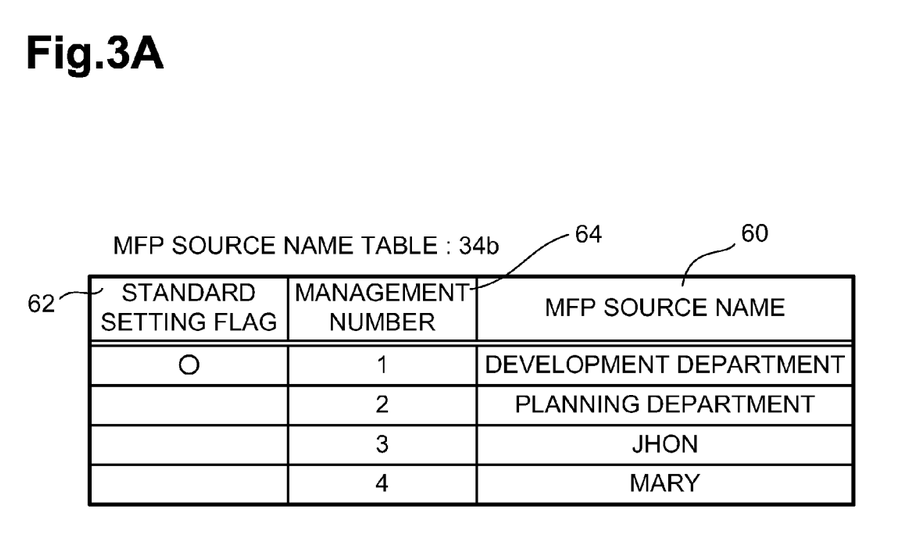
FIG. 3A depicts a schematic example of the structure of a multifunctional peripheral apparatus ("MFP") source name table.

FIG. 3A schematically depicts an example of the structure of MFP source name table 34b provided in MFP 30. MFP source names 60 registered by the user may be stored in MFP source name table 34b. A standard setting flag 62 and a management number 64 may be associated with each MFP source name 60.

Standard setting flag 62 may indicate default MFP source name 60. The user may select one of the plurality of kinds of MFP source names 60 stored in MFP source name table 34b as default MFP source name 60 in advance. Standard setting flag 62 indicating default MFP source name 60 may be indicated with a circle (○) in FIG. 3A. Management number 64 may be a unique value allocated to each of the plurality of kinds of MFP source names 60 stored in MFP source name table 34b. Each MFP source name 60 may be associated with a FAX number stored in telephone book memory 34a through corresponding management number 64.

Figure 3B:
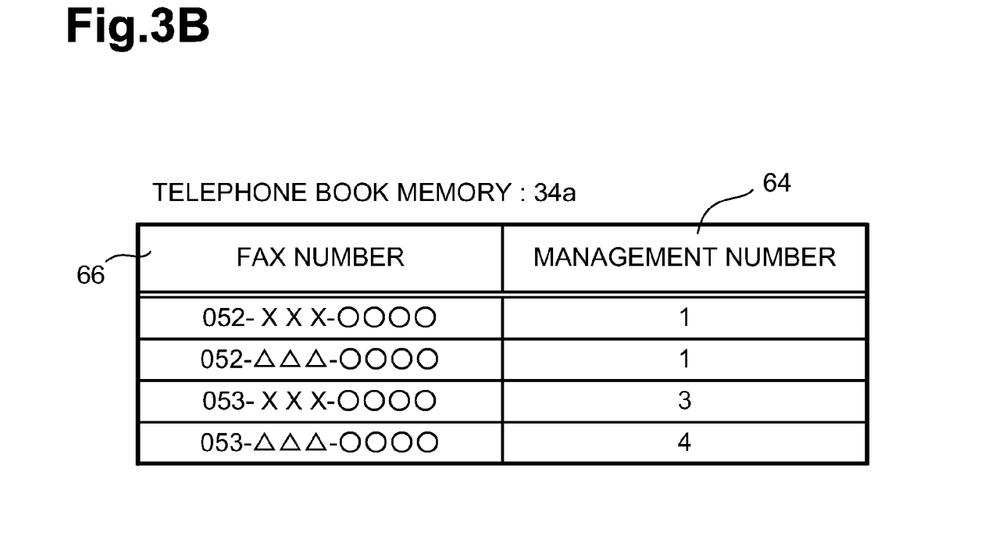
FIG. 3B depicts a schematic example of the structure of a telephone book memory.

FIG. 3B schematically depicts an example of the structure of telephone book memory 34a provided in MFP 30. FAX numbers 66 registered by the user in MFP 30 may be stored in telephone book memory 34a. Management number 64 of each MFP source name 60 may be stored in telephone book memory 34a in association with corresponding FAX number 66.

When FAX number 66, which is the same as the FAX number of the destination apparatus, is registered in telephone book memory 34a, MFP 30 may read MFP source name 60, which is identified by management number 64, by using management number 64 associated with the FAX number from MFP source name table 34b to generate source name 54, which comprises MFP source name 60. When FAX number 66, which is the same as the FAX number of the destination apparatus, is not stored in telephone book memory 34a or when FAX number 66, which is the same as the FAX number of the destination apparatus, is stored but management number 64 corresponding to FAX number 66 is not stored in telephone book memory 34a; MFP 30 may generate source name 54 comprising a default MFP source name 60.

Figure 3C:
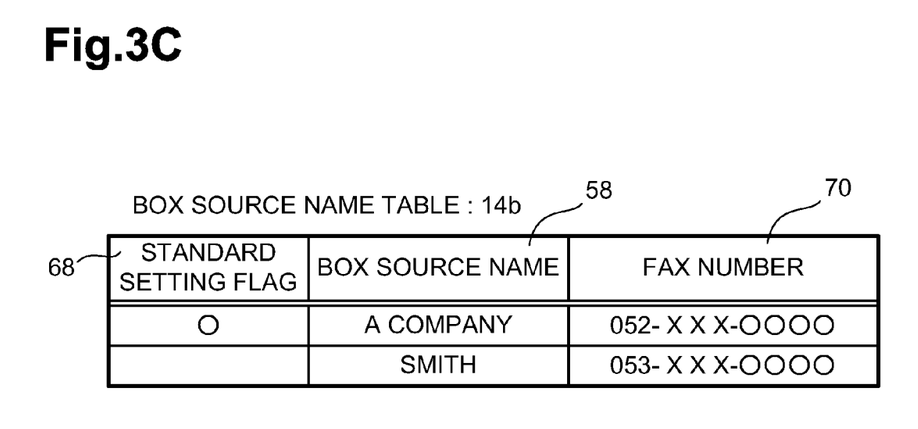
FIG. 3C depicts a schematic example of the structure of a line control apparatus (hereinafter referred to as "BOX") source name table.

FIG. 3C schematically depicts an example of the structure of BOX source name table 14b provided in BOX 10. BOX source names 58 registered by the user may be stored in BOX source name table 14b. A standard setting flag 68 and a FAX number 70 may be associated with each BOX source name 58.

Standard setting flag 68 may indicate default BOX source name 58. The user may select in advance one of the plurality of kinds of BOX source names 58 stored in BOX source name table 14b as default BOX source name 58. Standard setting flag 68 of default BOX source name 58 may be indicated with a circle (○) in FIG. 3C. The user may register FAX number 70 in BOX 10. The same FAX number may be registered in BOX source name table 14b in BOX 10 and in telephone book memory 34a in MFP 30. BOX source name table 14b and telephone book memory 34a may have different FAX numbers registered therein.

As described above, FAX number 70 may be associated with each of the plurality of kinds of BOX source names 58 in BOX source name table 14b. Accordingly, when BOX source name 58 corresponding to FAX number 70, which is the same as the FAX number of the destination apparatus, is registered in BOX source name table 14b, BOX 10 may read BOX source name 58 and may notify MFP 30 corresponding to BOX source name 58 that is read. When FAX number 70, which is the same as the FAX number of the destination apparatus, is not stored in BOX source name table 14b or when FAX number 70, which is the same as the FAX number of the destination apparatus, is stored, but BOX source name 58 corresponding to FAX number 70 is not stored in BOX source name table 14b, BOX 10 may notify MFP 30 of default BOX source name 58.

The user may indicate an MFP source name 60 to associate with each FAX number 66 and may select an MFP source name 60 as default MFP source name 60 using operation unit 41 in MFP 30. Similarly, the user may indicate how each FAX number 70 is associated with BOX source name 58 and may select BOX source name 58 that is desired as default BOX source name 58 using operation unit 23 in BOX 10.

Figure 4:
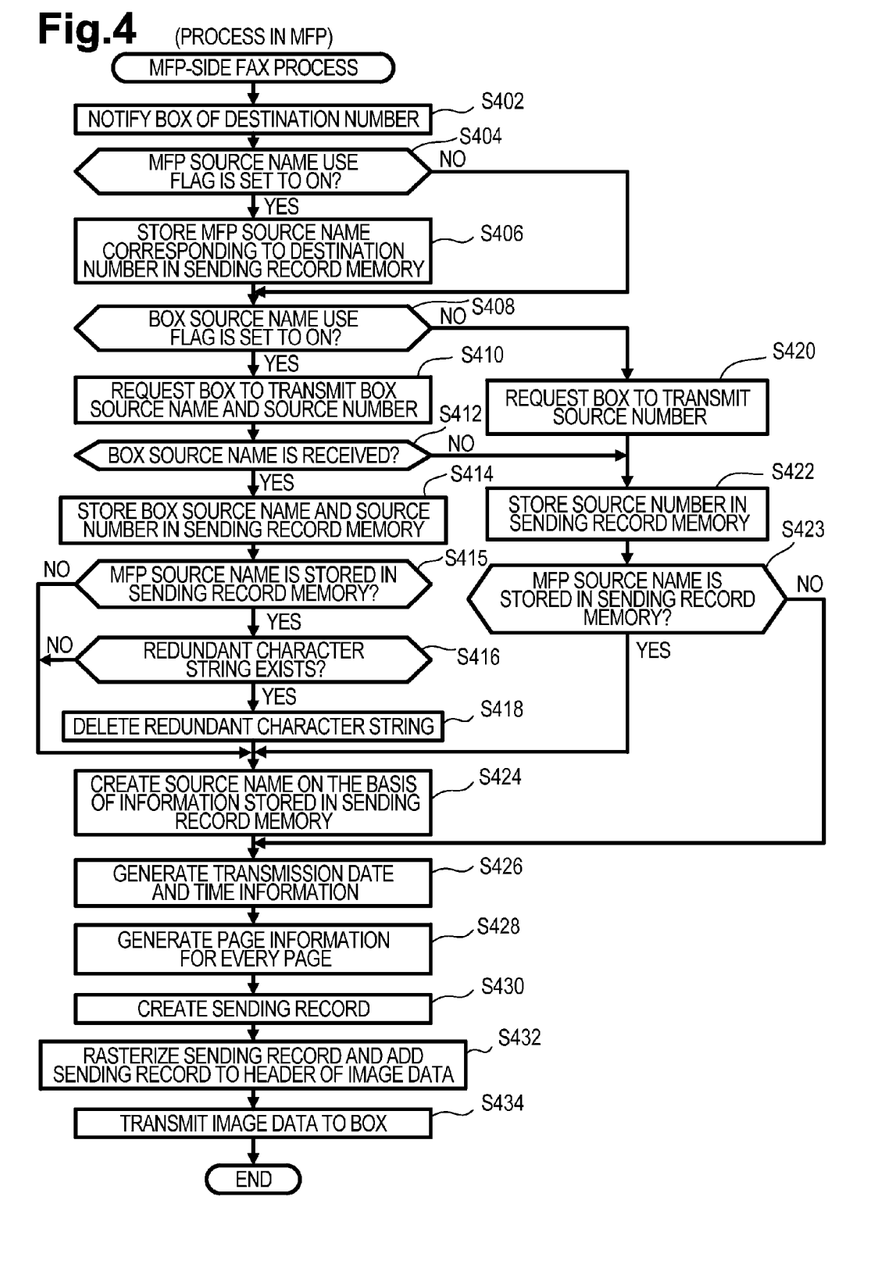
FIG. 4 is a flow chart depicting an MFP-side facsimile (hereinafter referred to as "FAX") process executed by a central processing unit ("CPU") in an MFP.

FIG. 4 is a flow chart depicting an MFP-side FAX process executed by CPU 31 in MFP 30. This process may generate sending record 50, add generated sending record 50 to image data, and transmit the image data comprising sending record 50 to BOX 10. The image data to be subjected to facsimile transmission may be generated by scanner 39 in MFP 30 and may be stored in image data memory 33a before the MFP-side FAX process executed by CPU 31 starts. The FAX number (hereinafter referred to as a "destination number") for identifying the destination apparatus of the facsimile transmission already may be set by the user in MFP 30.

Referring to FIG. 4, in Step S402, CPU 31 may notify BOX 10 of the destination number. In Step S404, CPU 31 may determine whether MFP source name use flag 34c is set to ON. When CPU 31 determines that MFP source name use flag 34c is set to ON (YES in Step S404), in Step S406, CPU 31 may read MFP source name 60 associated with FAX number 66, which is the same as the destination number, and may store the readout MFP source name 60 in sending record memory 33b. Specifically, CPU 31 may refer to telephone book memory 34a (depicted in FIG. 3B) to acquire management number 64, which is associated with FAX number 66 that is the same as the destination number, and may read MFP source name 60, which is identified by management number 64 from MFP source name table 34b.

When there is no MFP source name 60 associated with FAX number 66, which is the same as the destination number, in Step S406, CPU 31 may read default MFP source name 60. As depicted in FIG. 3A, default MFP source name 60 may be indicated by standard setting flag 62, and CPU 31 may store read MFP source name 60 in sending record memory 33b. When CPU 31 determines that MFP source name use flag 34c is not set to ON (NO in Step S404), the process may skip Step S406.

In Step S408, CPU 31 may determine whether BOX source name use flag 34d is set to ON. When CPU 31 determines that BOX source name use flag 34d is set to ON (YES in Step S408), in Step S410, CPU 31 may transmit a data transmission request to request BOX source name 58 and to source number 55 to BOX 10. In Step S412, CPU 31 may determine whether BOX source name 58 is received from BOX 10. When CPU 31 determines that BOX source name 58 is received from BOX 10 (YES in Step S412), in Step S414, CPU 31 may store BOX source name 58 and source number 55 received from BOX 10 in sending record memory 33b.

In Step S415, CPU 31 may determine whether MFP source name 60 is stored in sending record memory 33b. When CPU 31 determines that MFP source name 60 is stored in sending record memory 33b (YES in Step S415), in Step S416, CPU 31 may determine whether a redundant character string exists in BOX source name 58 and MFP source name 60 stored in sending record memory 33b. In the present embodiment, when CPU 31 searches for a redundant character string, CPU 31 may search MFP source name 60 for redundant character strings from the beginning of each character string, and CPU 31 may search BOX source name 58 for redundant character strings from the end of each character string to increase the processing speed. This may increase processing speed because, when source name 54, which indicates one's department, is hierarchically described, e.g., when BOX source name 58 indicates "Company A, Development Department" and MFP source name 60 indicates "Development Department, Smith," redundant character strings may exist at the beginning of MFP source name 60 and the end of BOX source name 58.

When CPU 31 determines that a redundant character string exists (YES in Step S416), in Step S418, CPU 31 may delete the redundant character string from either of BOX source name 58 and MFP source name 60. In Step S424, CPU 31 may generate source name 54 as a character string by adding MFP source name 60 to the end of BOX source name 58. Through the above-described steps, CPU 31 may generate source name 54 (e.g., Company A, Development Department, Smith), in which the redundant part (i.e., Development Department) is deleted from the character string (e.g., Company A, Development Department, Development Department, Smith) resulting from adding BOX source name 58 to MFP source name 60. Accordingly, it may be possible to reduce redundancy in source name 54.

When CPU 31 determines that no redundant character string exists (NO in Step S416), the process may skip Step S418 and, in Step S424, CPU 31 may add BOX source name 58 and MFP source name 60 together to generate source name 54. Consequently, CPU 31 may generate source name 54 comprising BOX source name 58 and MFP source name 60. When CPU 31 determines that MFP source name 60 is not stored in sending record memory 33b (NO in Step S415), in Step S424, CPU 31 may generate source name 54, which comprises BOX source name 58 and does not comprise MFP source name 60, based on BOX source name 58 stored in sending record memory 33b.

When CPU 31 determines that BOX source name use flag 34d is set to OFF (NO in Step S408), in Step S420, CPU 31 may transmit a data transmission request, in which CPU 31 requests request source number 55, to BOX 10. In S422, CPU 31 may store source number 55, which is transmitted from BOX 10 in response to the data transmission request, in sending record memory 33b.

BOX 10 may return only source number 55 to MFP 30, even when MFP 30 requests BOX source name 58 and source number 55 of BOX 10 as depicted in, for example, Step S410. In such a case, because MFP 30 does not receive BOX source name 58 (NO in Step S412), in Step S422, CPU 31 may store source number 55, which is received from BOX 10, in sending record memory 33b. This situation is described below in further detail, with reference to FIG. 5.

In Step S423, CPU 31 may determine whether MFP source name 60 is stored in sending record memory 33b. When CPU 31 determines that MFP source name 60 is stored in sending record memory 33b (YES in Step S423), in Step S424, CPU 31 may generate source name 54, which does not comprise BOX source name 58 but comprises MFP source name 60.

In Step S426, CPU 31 may generate the transmission date and time information 52 based on the current date and time read from timer circuit 42. In Step S428, CPU 31 may generate page information 56 for every page. In Step S430, CPU 31 may generate sending record 50 (refer to FIG. 2A) comprising transmission date and time information 52, source name 54, source number 55, and page information 56. When CPU 31 does not receive BOX source name 58 from BOX 10 (NO in Step S412) and MFP source name 60 is not stored in sending record memory 33b (NO in S423), in Steps S426, S428, and S430, CPU 31 may not generate source name 54 and may generate sending record 50, which does not comprise source name 54.

In Step S432, CPU 31 may rasterize sending record 50 and may add sending record 50 to the header of image data. In Step S434, CPU 31 may transmit the image data comprising sending record 50 to BOX 10. Thereafter, the process depicted in FIG. 4 may be terminated.

Figure 5:
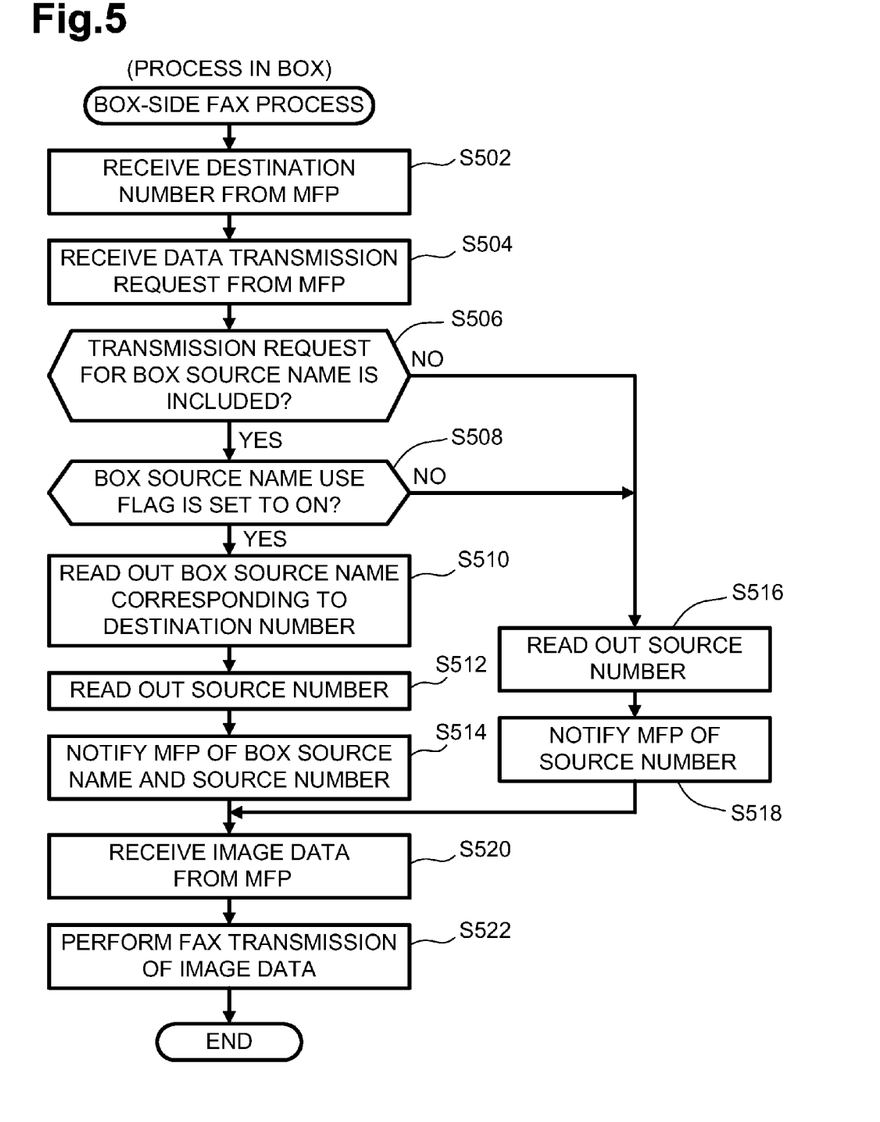
FIG. 5 is a flow chart depicting a BOX-side FAX process executed by a CPU in a BOX.

FIG. 5 is a flow chart depicting a BOX-side FAX process executed by CPU 11 in BOX 10. In this process, CPU 11 receives image data from MFP 30 and performs the facsimile transmission of the image data to the destination apparatus. This process may be started when Box 10 receives a request for the facsimile transmission from MFP 30.

Referring to FIG. 5, in Step S502, CPU 11 may receive the destination number from MFP 30. In Step S504, CPU 11 may receive a data transmission request from MFP 30. In Step S506, CPU 11 may determine whether the data transmission request comprises a transmission request for BOX source name 58. When CPU 11 determines that the data transmission request comprises a transmission request for BOX source name 58 (YES in Step S506), in Step S508, CPU 11 may determine whether BOX source name use flag 14c is set to ON. When CPU 11 determines that BOX source name use flag 14c is set to ON (YES in step S508), in Step S510, CPU 11 may read BOX source name 58 associated with FAX number 70, which is the same as the destination number, from BOX source name table 14b. When BOX source name 58, which is associated with FAX number 70 that is the same as the destination number, is not stored in BOX source name table 14b, in Step S510, CPU 11 may read default BOX source name 58 (depicted in FIG. 3C) indicated by standard setting flag 68.

In Step S512, CPU 11 may read source number 55 from source number memory 14a. In Step S514, CPU 11 may notify MFP 30 of source number 55 and BOX source name 58, which CPU 11 read from BOX source name table 14b. When CPU 11 determines that BOX source name use flag 14c is not set to ON (NO in Step S506 or NO in Step S508), e.g., when BOX source name use flag 34d is set to OFF in MFP 30 or when BOX source name use flag 14c is set to OFF in BOX 10, in Step S516, CPU 11 may read source number 55 from source number memory 14a. In Step S518, CPU 11 may notify MFP 30 of source number 55.

In Step S520, CPU 11 may receive image data comprising sending record 50 from MFP 30. In Step S522, CPU 11 may transmit the image data, via facsimile, to the destination apparatus identified by the destination number. Thereafter, the process in FIG. 5 may be terminated.

Communication system 1 of the present embodiment may comprise BOX source name 58 and MFP source name 60, which are associated with FAX number 70 and FAX number 66, respectively, that are the same as the destination number in source name 54. In addition, even when BOX source name 58 and MFP source name 60 are not associated with FAX number 70 and FAX number 66, respectively, that are the same as the destination number, it may be possible for source name 54 to comprise default BOX source name 58 or default MFP source name 60. Accordingly, communication system 1 may generate the appropriate source name 54, depending on the destination or the situation.

Furthermore, combining the determination of whether BOX source name 58 exists and the determination of whether MFP source name 60 exists may allow source names 54 of three patterns (e.g., source name 54 that comprises both BOX source name 58 and MFP source name 60, source name 54 that comprises only BOX source name 58, and source name 54 that comprises only MFP source name 60) to be generated from BOX source name 58 and MFP source name 60. Accordingly, this configuration may reduce the work burden of the registration on the user when compared to a situation in which a user registers source names 54 of the three patterns in advance.

For example, a user, who works at home, may want to switch source name 54 between a company and an individual. In such a situation, the user may register the company name as BOX source name 58 and may set the personal name as MFP source name 60 to easily switch source name 54 between the company name, the personal name, and a combination of the company name and the personal name.

Specifically, the user may set MFP source name use flag 34c to OFF and BOX source name use flags 14c and 34d to ON, such that source name 54 comprises only BOX source name 58 (e.g., the company name). Similarly, the user may set MFP source name use flag 34c to ON and either of BOX source name use flags 14c and 34d to OFF, such that source name 54 comprises only MFP source name 60 (e.g., the name of a person).

In the above-described embodiments, although MFP 30 is an example of the image processing apparatus in the above embodiments, various apparatus may be examples of the image processing apparatus. Such various apparatus may comprise a mobile phone, a personal computer, and a digital camera.

Although a plurality of MFPs 30 may be connected to one BOX 10 in communication system 1 of each of the above embodiments, the present invention may apply to a use mode in which one MFP 30 is connected to one BOX 10.

In the above-described embodiments, the user may determine whether sending record 50 in MFP 30 comprises one or more of transmission date and time information 52, source number 55, and page information 56.

Source name 54 may comprise MFP source name 60, which the user inputs using operation unit 41 in MFP 30, instead of MFP source name 60, which is registered in advance. Alternatively, source name 54 may comprise a user name of a user who logs onto MFP 30 as MFP source name 60.

Although BOX source name 58 may be arranged toward the beginning of sending record 50, as compared with MFP source name 60, as described in the above-described embodiments, the user may set the arrangement order of BOX source name 58 and MFP source name 60.

One BOX source name 58 may set as default BOX source name 58 in BOX source name table 14b in the above-described embodiments (refer to FIG. 3C). Alternatively or additionally, default BOX source name 58 may be set for every MFP 30 when the plurality of MFPs 30 perform the facsimile transmission via BOX 10.

In the above-described embodiments, when BOX source name table 14b stores only one kind of BOX source name 58 or when MFP source name table 34b stores only one kind of MFP source name 60, BOX source name 58 of the one kind and MFP source name 60 of the one kind may be used as BOX source name 58 and MFP source name 60 for all the destination apparatus.

In the above-described embodiments, CPU 31 and CPU 11 may perform the various functions. In other embodiments, another or other processors, e.g., an Application Specific Integrated Circuit ("ASIC") or a logic circuit, may perform the various functions.

While the invention has been described in connection with various exemplary structures and illustrative embodiments, it will be understood by those skilled in the art that other variations and modifications of the structures, configurations, and embodiments described above may be made without departing from the scope of the invention. For example, this application may comprise any possible combination of the various features disclosed herein, and the particular features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A communication system comprising:
a communication apparatus configured to communicate with a destination apparatus; and
an image processing apparatus configured to connect with the communication apparatus,
wherein the communication apparatus comprises:
a first memory configured to store first source identification information, wherein the first source identification information comprises a first character string comprising at least one character; and
an additional-information notifying portion configured to notify the image processing apparatus of the first source identification information stored in the first memory, and
wherein the image processing apparatus comprises:
a second memory configured to store second source identification information, wherein the second source identification information comprises a second character string comprising at least one character;
an information generator configured to generate third source identification information,
wherein the third source identification information comprises the first source identification information notified by the additional-information notifying portion and the second source identification information stored in the second memory, and
wherein the third source identification information comprises a third character string comprising at least one character; and
a first transmitter configured to add the third source identification information generated by the information generator to image data and to transmit the image data comprising the third source identification information to the communication apparatus,
wherein the communication apparatus further comprises:
a second transmitter configured to transmit the image data transmitted from the first transmitter to the destination apparatus, and
wherein the first source identification information and the second source identification information identify a source of the image data transmitted to the destination apparatus, and
wherein the information generator is further configured to:
determine whether a portion of the first character string is identical to a portion of the second character string;
delete the identical portion from one of the first character string and the second character string when the portion of the first character string is identical to the portion of the second character string; and
generate the third character string by combining an undeleted portion of the first character string with an undeleted portion of the second character string.

2. The communication system according to claim 1, wherein the communication apparatus further comprises:
a first-setting memory configured to store first-setting information indicating whether the third source identification information comprises the first source identification information, and
wherein the third source identification information does not comprise the first source identification information when the first-setting information stored in the first-setting memory indicates that the third source identification information does not to comprise the first source identification information.

3. The communication system according to claim 1,
wherein the image processing apparatus further comprises:
a second-setting memory configured to store second-setting information indicating whether the third source identification information is to comprise the second source identification information, and
wherein the third source identification information does not comprise the second source identification information when the second-setting information stored in the second-setting memory indicates that the third source identification information is not to comprise the second source identification information.

4. The communication system according to claim 1,
wherein the first source identification information and the second source identification information each indicate a source of the image data, and
wherein the information generator is configured to arrange the first source identification information closer than the second source identification information to a beginning of the third source identification information.

5. The communication system according to claim 1,
wherein the information generator is configured to arrange successively the first source identification information and the second source identification information when generating the third source identification information.

6. The communication system according to claim 1,
wherein the image processing apparatus further comprises:
a first-identification information memory configured to store a plurality of identification information; and
an identification information notifying portion configured to notify the communication apparatus of identification information for identifying the destination apparatus,
wherein the second memory is configured to store a plurality of second source identification information and each of the plurality of second source identification information are associated with at least one of the plurality of identification information stored in the first-identification information memory, and
wherein the third source identification information comprises particular second source identification information, which is associated with particular identification information that is the same as the identification information for identifying the destination apparatus notified by the identification information notifying portion to the communication apparatus, from among the plurality of second source identification information, when the particular second source identification information is stored in the second memory.

7. The communication system according to claim 6,
wherein the second memory is configured to store default second source identification information, which is different from each of the plurality of second source identification information, and
wherein the third source identification information comprises the default second source identification information when certain second source identification information, which is associated with the particular identification information that is the same as the identification information for identifying the destination apparatus notified by the identification information notifying portion to the communication apparatus, is not stored in the second memory.

8. The communication system according to claim 6,
wherein the communication apparatus further comprises:
a second-identification information memory configured to store a plurality of pre-registered identification information; and
an identification information receiver configured to receive the pre-registered identification information for identifying the destination apparatus from the image processing apparatus,
wherein the first memory is configured to store a plurality of first source identification information and each of the plurality of first source identification information are associated with at least one of the plurality of identification information stored in the second identification information memory, and
wherein the additional-information notifying portion is configured to notify the image processing apparatus of particular first source identification information stored in the first memory, which is associated with certain identification information that is the same as the identification information for identifying the destination apparatus received by the identification information receiver, from among the plurality of first source identification information, when the particular first source identification information is stored in the first memory.

9. The communication system according to claim 8,
wherein the first memory is configured to store one of the plurality of first source identification information as default first source identification information, and
wherein the additional-information notifying portion is configured to notify the image processing apparatus of the default first source identification information when certain first source identification information, which is associated with the certain identification information that is the same as the identification information for identifying the destination apparatus received by the identification information receiver, is not stored in the first memory.

10. A communication apparatus comprising:
a first memory configured to store first source identification information, wherein the first source identification information comprises a first character string comprising at least one character;
an additional-information notifying portion configured to notify an image processing apparatus of the first source identification information stored in the first memory,
a receiver configured to receive image data to which third source identification information is added from the image processing apparatus,
wherein the third source identification information comprises the first source identification information notified from the additional-information notifying portion and second source identification information stored in a second memory provided in the image processing apparatus when certain setting information exists for the communication apparatus,
wherein the second source identification information comprises a second character string comprising at least one character,
wherein the third source identification information comprises a third character string comprising at least one character, and
wherein the third character string is a combination of an undeleted portion of the first character string and an undeleted portion of the second character string, such that the third character string comprises only one instance of an identical portion, which is a portion of the first character string that is identical to a portion of the second character string; and a transmitter configured to transmit the image data received by the receiver to the destination apparatus, wherein the first source identification information and the second source identification information identify a source of the image data transmitted to the destination apparatus.

11. The communication apparatus according to claim 10, further comprising:

a setting portion configured to store setting information indicating whether the third source identification information comprises the first source identification information, wherein the additional-information notifying portion does not notify an image processing apparatus of the first source identification information stored in the first memory when the setting information stored in the setting portion indicates that the third source identification information does not comprise the first source identification information, wherein the receiver is configured to receive the image data comprising third source identification information added from the image processing apparatus, and wherein the third source identification information does not comprise the first source identification information when the setting information stored in the setting portion indicates that the third source identification information is not to comprise the first source identification information.

12. The communication apparatus according to claim 10, wherein the first source identification information and the second source identification information indicate a source of the image data, and wherein the third source identification information comprises the first source identification information arranged closer than the second source identification information to a beginning of the third source identification information.

13. The communication apparatus according to claim 10, wherein the third source identification information comprises the first source identification information and the second source identification information in succession.

14. An image processing apparatus comprising:

a receiver configured to receive first source identification information from a communication apparatus, wherein the first source identification information comprises a first character string comprising at least one character;

a memory configured to store second source identification information, wherein the second source identification information comprises a second character string comprising at least one character;

an information generator configured to generate third source identification information, wherein the third source identification information comprises the first source identification information received by the receiver and the second source identification information stored in the memory, and wherein the third source identification information comprises a third character string comprising at least one character; and a transmitter configured to add the third source identification information generated by the information generator to image data and to transmit the image data comprising the third source identification information to the communication apparatus, wherein the first source identification information and the second source identification information identify a source of the image data transmitted to the destination apparatus, and wherein the information generator is further configured to:
determine whether a portion of the first character string is identical to a portion of the second character string;
delete the identical portion from one of the first character string and the second character string when the portion of the first character string is identical to the portion of the second character string; and
generate the third character string by combining an undeleted portion of the first character string with an undeleted portion of the second character string.

15. The image processing apparatus according to claim 14, wherein the third source identification information does not comprise the first source identification information when the receiver does not receive the first source identification information from the communication apparatus.

16. The image processing apparatus according to claim 14, further comprises:

a setting portion configured to store setting information indicating whether the third source identification information comprises the second source identification information, wherein the third source identification information does not comprise the second source identification information when the setting information stored in the setting portion indicates that the third source identification information does not comprise the second source identification information.

17. The image processing apparatus according to claim 14, wherein the first source identification information and the second source identification information indicate a source of the image data, and wherein the third source identification information comprises the first source identification information arranged closer than the second source identification information to a beginning of the third source identification information.

18. The image processing apparatus according to claim 14, wherein the third source identification information comprises the first source identification information and the second source identification information in succession.

* * * * *